Jan. 15, 1957  W. G. COLCLAZIER  2,777,270
POWER MOWER WITH PNEUMATIC CONVEYING AND COLLECTING MEANS
Filed Dec. 31, 1954  2 Sheets-Sheet 1

INVENTOR
WAYNE G. COLCLAZIER,

BY
McMorrow, Berman & Davidson
ATTORNEYS

Jan. 15, 1957 W. G. COLCLAZIER 2,777,270
POWER MOWER WITH PNEUMATIC CONVEYING AND COLLECTING MEANS
Filed Dec. 31, 1954 2 Sheets-Sheet 2

INVENTOR
WAYNE G. COLCLAZIER,

BY
McMorrow, Berman + Davidson
ATTORNEYS

United States Patent Office 2,777,270
Patented Jan. 15, 1957

2,777,270

POWER MOWER WITH PNEUMATIC CONVEYING AND COLLECTING MEANS

Wayne G. Colclazier, Hugoton, Kans.

Application December 31, 1954, Serial No. 479,123

4 Claims. (Cl. 56—25.4)

The invention relates to power lawn mowers, and more particularly to an improved power lawn mower provided with means for collecting grass cuttings, leaves, and other debris beneath the lawn mower as the lawn mower is moved over its course of travel.

A main object of the invention is to provide a novel and improved power lawn mower provided with pneumatic air operated collecting means for collecting grass cuttings, leaves, and similar lawn debris as the lawn mower moves over its path of travel, the improved lawn mower involving relatively simple components, being easy to operate, and providing a sweeping action simultaneously with the cutting of the grass.

A further object of the invention is to provide an improved power lawn mower of the rotary blade type, said lawn mower being provided with pneumatic debris collecting means for collecting grass cuttings and the like from the lawn as the lawn mower moves thereover, the improved lawn mower being inexpensive to fabricate, being rugged in construction, and enabling the user to clear the lawn of loose debris simultaneously with the cutting or trimming of the lawn grass.

Further objects and advantages of the invention will become apparent from the following description and claims, and from the accompanying drawings, wherein:

Figure 1:
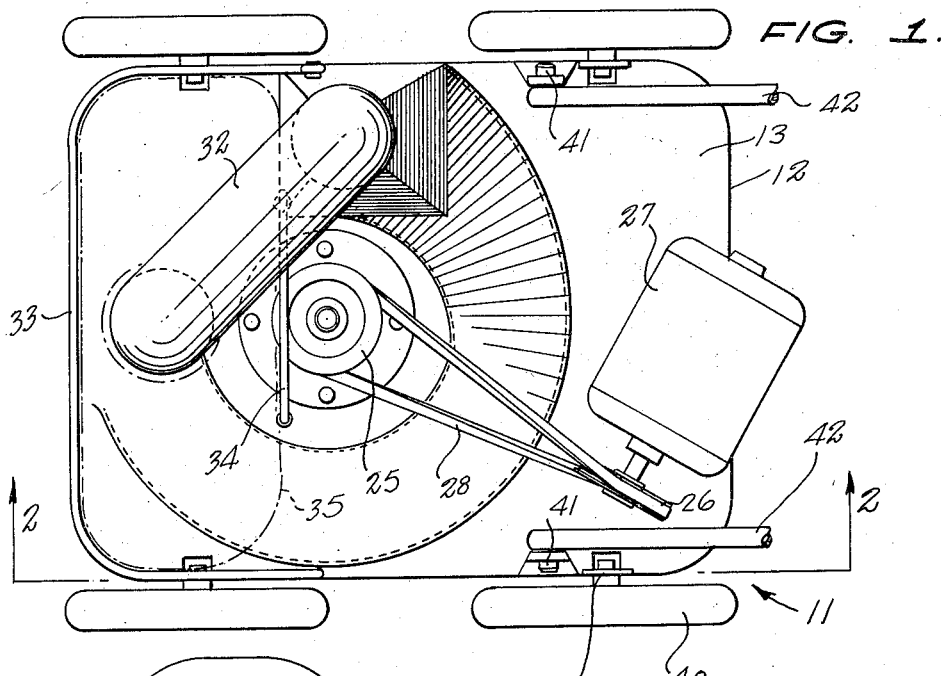
Figure 1 is a fragmentary top plan view of an improved lawn mower constructed in accordance with the present invention.

Referring to the drawings, and more particularly to Figures 1 to 4, the improved power lawn mower is designated generally at 11 and comprises a wheeled horizontal housing member 12, said housing member comprising a main plate 13 of any suitable shape, such as rectangular, said main plate having secured to its forward and side margins a continuous depending flange 14. Secured to the plate member 13 and the opposite side portions of the flange 14 are generally arcuate inner partition members 15 and 16 arranged concentrically with respect to a vertical shaft 17 which is journaled on the intermediate portion of said plate member 13. The arcuate wall element 15 is provided with the inwardly directed bottom horizontal flange 17', and the housing is provided with a bottom cover element 18 between the wall element 16 and the depending flange portion 19, shown in Figure 4, of the plate member 13, whereby a generally circular cavity 20 is defined within the housing 12, said cavity containing the vertical shaft 17 centrally located therein.

Figure 3:
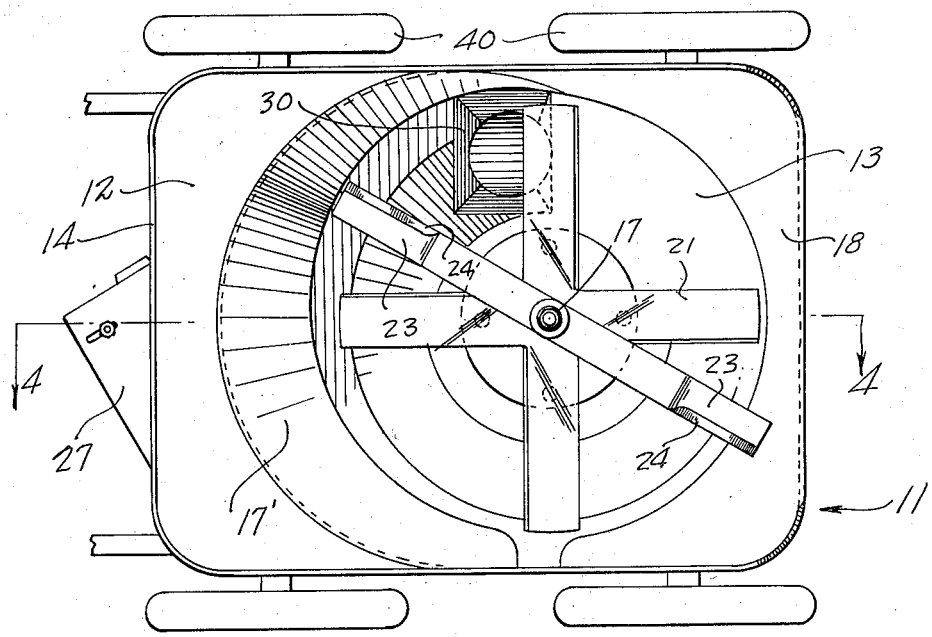
Figure 3 is a bottom view of the lawn mower structure shown in Figures 1 and 2.
Figure 4:
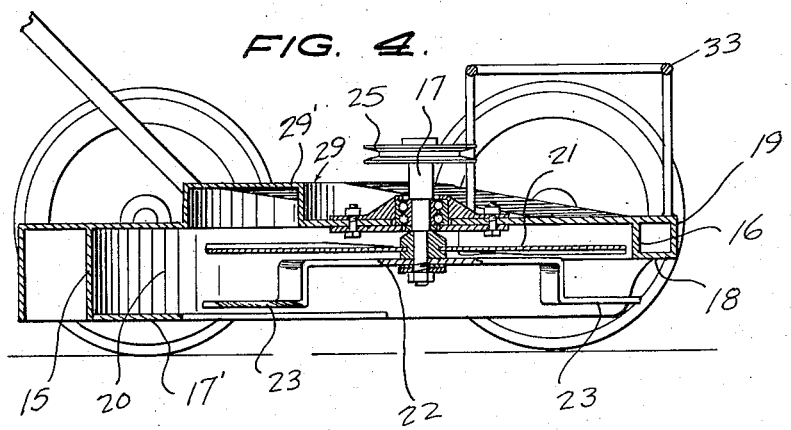
Figure 4 is a vertical cross sectional view taken on the line 4—4 of Figure 3.

Secured on the vertical shaft 17 below the plate member 13 is a four-bladed fan 21, and detachably secured to the shaft end below the fan 21 is the rotary cutting blade 22, said cutting blade being provided with the downwardly offset opposite end portions 23 having the sharpened cutting edges 24 as is clearly shown in Figure 3.

The top portion of the shaft 17 has mounted thereon a suitable pulley 25 which may be coupled to a drive pulley 26 mounted on the shaft of a suitable electric motor 27 which is in turn mounted on plate member 13. Obviously, a gasoline engine may be employed in place of the electric motor 27, if so desired.

Figure 2:
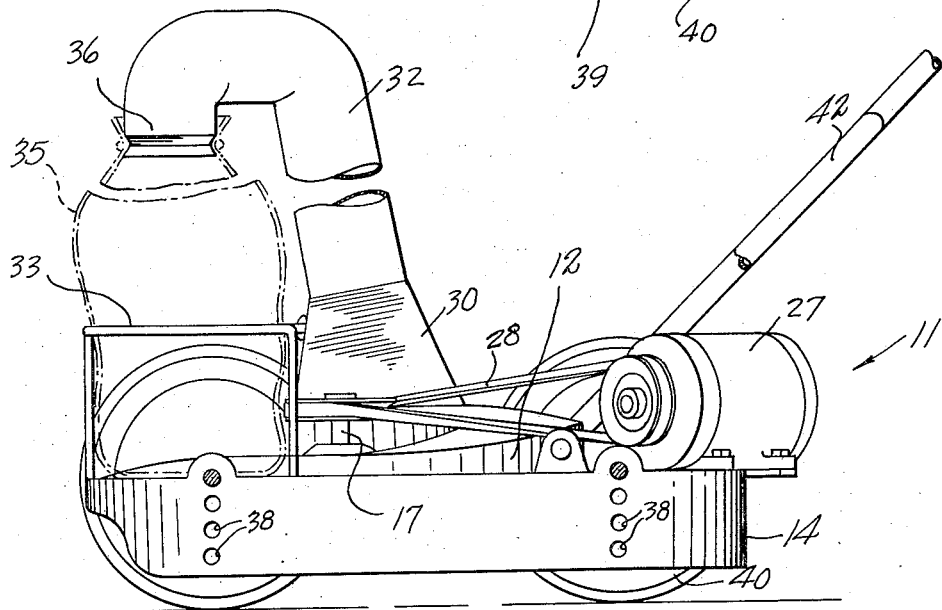
Figure 2 is a fragmentary vertical cross sectional view taken on the line 2—2 of Figure 1.

As shown in Figures 1 and 2, the shaft pulley 25 is drivingly coupled to the motor pulley 26 by a suitable belt 28.

The plate member 13 is formed with an arcuate downwardly facing air channel 29 arranged concentrically with the shaft 17 and overlying the outer portions of the blades of the fan 21. The downwardly facing channel 29 has a gradually ascending top wall 29', and said channel terminates at an upwardly convergent transition conduit 30 which is connected to one end of a generally inverted U-shaped conduit 32.

Mounted on the forward portion of the housing 12 is an upstanding marginal rail 33, and secured on said housing in spaced relation to the rail 33 is a transversely extending upstanding rail 34, the rails 33 and 34 defining a supporting enclosure in which may be positioned a suitable collection receptacle, such as a porous sack 35, of burlap, or the like, which may be secured around the depending end portion 36 of the U-shaped conduit 32, as shown in dotted view in Figure 2.

The side portions of the depending flange 14 are provided at suitably spaced locations thereon with respective vertically spaced apertures 38. Secured to the flange at selected apertures 38 are respective axle members 39 on which are journaled the supporting wheels 40, whereby the housing 12 may be supported at an adjusted elevation with respect to the ground.

Pivoted to the side portions of the housing 12 at 41 are the ends of respective handle bar elements 42 of conventional construction.

In using the device, the fan 21 provides a blower action inducing an upward air draft through the channel 29 and through the conduit 32, into the porous collection receptacle 35, simultaneously with the rotation of the cutting blade 22, whereby grass cuttings and other loose debris on the lawn will be drawn upwardly to channel 29 and conduit 32 into the receptacle 35 simultaneously with the grass cutting action of the mower. Such other loose debris may include small twigs, dead leaves, and similar material.

Figure 5:
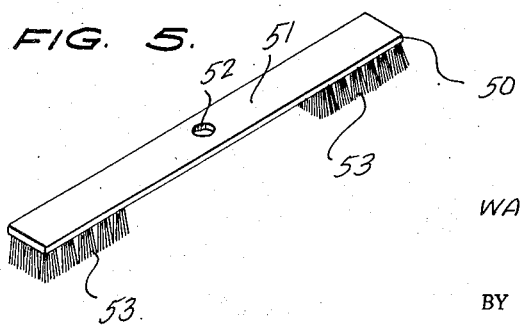
Figure 5 is a perspective view of a brush attachment which may be employed on the lawn mower of Figures 1 to 4 to loosen leaves and similar debris embedded in the lawn so that such debris may be picked up by the lawn mower.

When it is desired to employ the device for a lawn sweeping action, the cutting blade 22 may be replaced by a rotary brush, such as the rotary brush designated at 50 in Figure 5, said rotary brush comprising a main body 51 having a central aperture 52 for securement to the lower end of shaft 17, and having depending opposite brush units 53 of suitable, relatively stiff material, such as wire or the like, which will be effective to loosen debris partially embedded in the ground, such as dead leaves, or the like, so that such debris will be picked up by the suction of fan 21 and will be drawn through channel 29 and conduit 32 into the collection receptacle 35.

While a specific embodiment of an improved lawn mower and debris collection device has been disclosed in the foregoing description, it will be understood that

What is claimed is:

1. In a power lawn mower, a wheeled horizontal housing member, said housing member comprising a main plate and a depending flange extending along the margins of said main plate, a vertical shaft journaled in said main plate, a fan secured to said shaft below said main plate, a cutting blade secured to said shaft below said fan, said blade having a cutting edge at its outer portion, said fan having vanes extending over the path of the cutting edge of the blade, driving means on said main plate connected to said shaft, a conduit connected to said main plate at a point spaced outwardly from said shaft and located over the area swept by the vanes of the fan, and a porous collection receptacle carried on said main plate and secured around the end of said conduit.

2. In a power lawn mower, a wheeled horizontal housing member, said housing member comprising a main plate and a depending flange extending along the margins of said main plate, a vertical shaft journaled on said main plate, a fan secured to said shaft below said main plate, a cutting blade secured to said shaft below said fan, said blade having a cutting edge at its outer portion, said fan having vanes extending over the path of the cutting edge of the blade, drive means on said main plate connected to said shaft, said main plate being formed with an arcuate, downwardly facing air channel concentric with and spaced outwardly from said shaft and located over the area swept by the vanes of the fan, a conduit connected to said channel, and a porous collection receptacle carried on said main plate and secured around the end of said conduit.

3. In a power lawn mower, a wheeled horizontal housing member, said housing member comprising a main plate and a depending flange extending along the margins of said main plate, a vertical shaft journaled on said main plate, a fan secured to said shaft below said main plate, a cutting blade secured to said shaft below said fan, said blade having a cutting edge at its outer portion, said fan having vanes extending over the path of the cutting edge of the blade, drive means on said main plate connected to said shaft, said main plate being formed with an arcuate, downwardly facing air channel concentric with and spaced outwardly from said shaft and located over the area swept by the vanes of the fan, said channel having a gradually ascending top wall, an inverted U-shaped conduit connected at one end to the uppermost portion of said channel and communicating with said channel, a supporting receptacle on said main plate adjacent the other end of said conduit, and a porous collection receptacle disposed in said supporting receptacle and secured around the last-named end of said conduit.

4. In a power lawn mower, a wheeled horizontal housing member, said housing member comprising a main plate and a depending flange extending along the margins of said main plate, a vertical shaft journaled on said main plate, a fan secured to said shaft below said main plate, a cutting blade secured to said shaft below said fan, said plate having downwardly offset cutting portions at its outer ends, said fan having vanes extending over the path of movement of said cutting portions, drive means on said main plate connected to said shaft, said main plate being formed with an arcuate, downwardly facing air channel concentric with and spaced outwardly from said shaft and located over the area swept by the vanes of the fan, said channel having a gradually ascending top wall, an inverted U-shaped conduit connected at one end to the uppermost portion of said channel and communicating with said channel, a supporting receptacle on said main plate adjacent the other end of said conduit, and a porous collection receptacle disposed in said supporting receptacle and secured around the last-named end of said conduit.

References Cited in the file of this patent

UNITED STATES PATENTS

| | | |
|---|---|---|
| 962,780 | Nelson | June 28, 1910 |
| 2,547,328 | Koch et al. | Apr. 3, 1951 |
| 2,664,685 | Phelps | Apr. 5, 1954 |